US009250870B2

(12) United States Patent
Moore, Jr. et al.

(10) Patent No.: US 9,250,870 B2
(45) Date of Patent: Feb. 2, 2016

(54) AUTOMATED CREATION OF SHIM PROGRAMS AND INTERFACES

(71) Applicant: International Business Machines Corporation, Armonk, NY (US)

(72) Inventors: John E. Moore, Jr., Brownsburg, IN (US); Jeffrey K. Price, Austin, TX (US); Robert R. Wentworth, Round Rock, TX (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/210,845

(22) Filed: Mar. 14, 2014

(65) Prior Publication Data

US 2015/0261508 A1    Sep. 17, 2015

(51) Int. Cl.
| | | |
|---|---|---|
| *H04L 9/08* | (2006.01) |
| *G06F 15/16* | (2006.01) |
| *G06F 15/00* | (2006.01) |
| *H04L 9/32* | (2006.01) |
| *G06F 9/44* | (2006.01) |
| *G06F 9/45* | (2006.01) |
| *G06F 9/455* | (2006.01) |
| *G06F 3/00* | (2006.01) |
| *G06F 9/46* | (2006.01) |
| *G06F 11/36* | (2006.01) |

(52) U.S. Cl.
CPC .............. *G06F 8/36* (2013.01); *G06F 11/3688* (2013.01)

(58) Field of Classification Search
CPC ......... G06F 8/443; G06F 9/547; G06F 9/465; G06F 9/541; G06F 9/4881; G06F 9/3879; G06F 9/30014; G06F 9/30025; G06F 9/30167; G06F 9/3017; G06F 11/3466; G06F 11/0763; G06F 11/1456; G06F 11/1464; G06F 11/1469; G06F 11/1471; G06F 17/30581; G06F 17/30637; G06F 17/30952; G06F 17/30985; G06F 17/30144; G06F 21/10; G06F 21/32
See application file for complete search history.

(56) References Cited

U.S. PATENT DOCUMENTS 4,437,149 A * 3/1984 Pomerene et al. ............ 712/213
5,740,457 A * 4/1998 Shiomi ......................... 715/234

(Continued)

OTHER PUBLICATIONS

Girkar, et al., "The x32 ABI: A New Software Convention for Performance on Intel® 64 Processors", Intel®, Intel® Technology Journal, Intelligent Embedded Systems, vol. 16, Issue 1, 2012, pp. 114-128.

(Continued)

*Primary Examiner* — Don Wong
*Assistant Examiner* — Anibal Rivera
(74) *Attorney, Agent, or Firm* — Jinesh P. Patel; Matthew Chung (57) ABSTRACT

A computing device determines a first set of functions in a first file having a first bit length. The computing device performs a first test, which includes executing a first test program capable of testing each function in the first set of functions. The computing device determines whether the first test was successful, and based on determining that the first test was successful, creates a shim program based on the first set of functions. The computing device creates a second file based on the first set of functions, the second file having a second bit length. The computing device performs a second test, which includes executing a second test program capable of testing each function in the second file. The computing device determines whether the second test was successful, and based on determining that the second test was successful, publishes one or more of the shim program and second file.

20 Claims, 6 Drawing Sheets

(56) References Cited

U.S. PATENT DOCUMENTS

| | | | |
|---|---|---|---|
| 5,903,755 | A | 5/1999 | Matheson et al. |
| 6,158,046 | A * | 12/2000 | Yoshida et al. ............... 717/151 |
| 6,237,076 | B1 * | 5/2001 | Gaertner et al. ................ 712/23 |
| 6,286,135 | B1 * | 9/2001 | Santhanam ................... 717/146 |
| 7,401,178 | B1 | 7/2008 | Tene et al. |
| 7,478,388 | B1 * | 1/2009 | Chen et al. ........................ 718/1 |
| 2002/0184373 | A1 * | 12/2002 | Maes ............................ 709/201 |
| 2007/0194879 | A1 * | 8/2007 | Backes et al. ................. 713/168 |
| 2011/0225569 | A1 * | 9/2011 | Beaty et al. ................... 717/127 |
| 2013/0044882 | A1 * | 2/2013 | Rich et al. ..................... 380/279 |
| 2013/0067449 | A1 * | 3/2013 | Sannidhanam et al. ...... 717/170 |
| 2014/0245328 | A1 * | 8/2014 | Morisaki et al. .............. 719/319 |

OTHER PUBLICATIONS

Peckham, SB, IBM, "Technique for Sharing Pointers between a 64-bit Process and a 32-Bit Operating System", An IP.com Prior Art Database Technical Disclosure, Original Publication Date: Feb. 1, 1999, Original Disclosure Information: RD v42 n418 02-99 article 41874, IP.com No. IPCOM000123615D, IP.com Electronic Publication: Apr. 5, 2005, pp. 1-2.

Smith, Duane A., "Adding 64-bit Pointer Support to a 32-bit Runtime Library", Digital Technical Journal, vol. 8, No. 2, pp. 83-95, 1996.

"32-bit and 64-bit Interoperability", provided in main idea on Jul. 22, 2013, © 2014 Microsoft, <http://msdn.microsoft.com/en-us/library/windows/desktop/ee872017>.

"Matt Nicholson's take on the computer industry: Accessing 32-bit DLLs from 64-bit code", Jun. 30, 2007, retrieved from website: <http://blog.mattmags.com/2007/06/30/accessing-32-bit-dlls-from-64-bit-code>.

"WoW64", Wikipedia, the free encyclopedia, this page was last modified on Nov. 4, 2013 at 18:59, pp. 1-3, <http://en.wikipedia.org/w/index.php?title=WoW64>.

* cited by examiner

AUTOMATED CREATION OF SHIM PROGRAMS AND INTERFACES

FIELD OF THE INVENTION

The present invention relates generally to 64 bit environments, and more particularly to automatically creating shim programs and interface to allow access to a 32 bit library from a 64 bit application.

BACKGROUND

As the computing industry moves to 64 bit operating systems and environments, there are many libraries, such as 32 bit libraries, that cannot be easily ported into a 64 bit environment. In many cases, the use of these legacy libraries in new 64 bit applications would save significant development and test time, while also reducing the risk arising from developing new 64 bit libraries. However, manually incorporating a 32 bit library into a 64 bit program involves manual processing by a highly skilled practitioner, including the practitioner manually building a shim program that runs in a 32 bit environment and exposes the 32 bit library to the 64 bit application through inter-process communication interfaces (IPC). A shim program is a small library that transparently intercepts an application programming interface (API) and changes the parameters passed, handles the operation itself, or redirects the operation elsewhere. Shims are utilized to allow new 64 bit software to interact with existing 32 bit libraries. Manually creating shim programs and interfaces can be a tedious process, which requires significant skill, a large amount of time, and is prone to errors.

SUMMARY

Embodiments of the present invention provide a system, method, and program product for creating a program to adapt a first file of a first bit length with an application of a second bit length. A computing device determines a first set of functions in a first file having a first bit length. The computing device performs a first test, which includes executing a first test program capable of testing each function in the first set of functions. The computing device determines whether the first test was successful, and based on determining that the first test was successful, creates a shim program based on the first set of functions. The computing device creates a second file based on the first set of functions, the second file having a second bit length. The computing device performs a second test, which includes executing a second test program capable of testing each function in the second file. The computing device determines whether the second test was successful, and based on determining that the second test was successful, publishes one or more of the shim program and second file.

DETAILED DESCRIPTION

As will be appreciated by one skilled in the art, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

Figure 1:
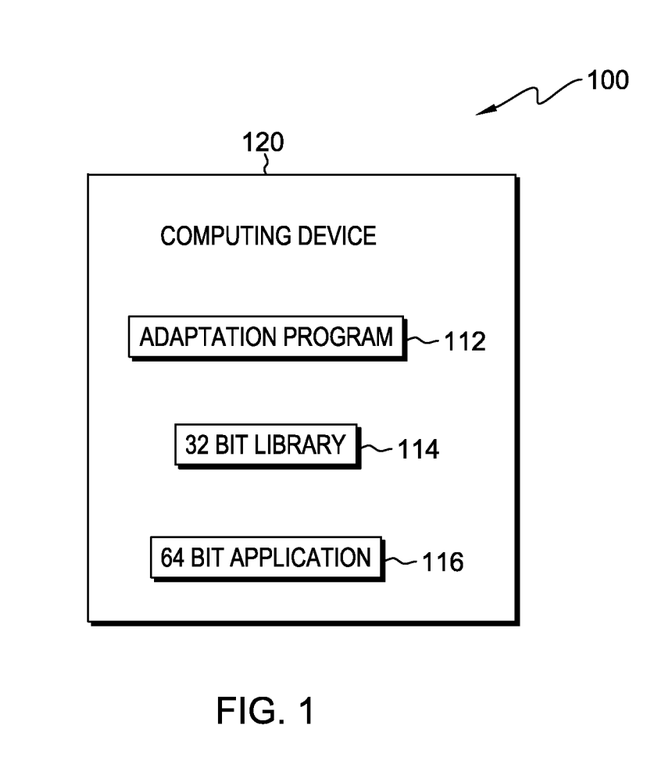
FIG. 1 illustrates an adaptation system, in accordance with an embodiment of the invention.

FIG. 1 illustrates adaptation system 100, in accordance with an embodiment of the invention. In the exemplary embodiment, adaptation system 100 includes computing device 120; however, in other embodiments, adaptation system 100 can include multiple computing devices interconnected over a network.

Computing device 120 includes adaptation program 112, 32 bit library 114, and 64 bit application 116. Computing device 120 may be a desktop computer, a notebook, a laptop computer, a tablet computer, a handheld device, a smartphone, a thin client, or any other electronic device or computing system capable of receiving and sending data to and from other computing devices via a network. While computing device 120 is shown as a single device, in other embodiments, computing device 120 may be comprised of a cluster or plurality of computing devices, working together or working separately. Computing device 120 is described in more detail with reference to FIG. 6.

In the exemplary embodiment, adaptation program 112 includes components to analyze headers, determine parameters of functions of a test program, and create a shim program to incorporate a 32 bit library into a 64 bit application. The operations of adaptation program 112 are described in further detail below with reference to FIG. 2.

In the exemplary embodiment, 32 bit library 114 is software created for a 32 bit environment which contains a collection of functions which implement behaviors written in terms of a computing language/code, which have well-defined interfaces by which the behaviors are invoked. In other words, a program can use a library to make system calls rather than rewriting the system call over and over again. In addition, library code is typically organized in such a way that it can be used by multiple programs that have no connection to each other, while code that is part of a program is organized to only be used within that one program.

In the exemplary embodiment, 64 bit application 116 is software that is created for a 64 bit environment. In the exemplary embodiment, 64 bit application 116 is capable of communicating with other programs via an application programming interface, and different processes of 64 bit application 116 are capable of communicating with each other via interprocess communication (IPC) interfaces.

FIGS. 2 through 5 depict a flowchart illustrating the operations of adaptation program 112 in creating a shim program to adapt a 32 bit file, such as a 32 bit library, to a 64 bit application, in accordance with an exemplary embodiment of the invention. In the exemplary embodiment, adaptation program 112 receives a request to adapt 32 bit library 114 so that it may be used by 64 bit application 116 (step 202). In the exemplary embodiment, adaptation program 112 receives the request from the user of computing device 120 via a user interface. In other embodiments, adaptation program 112 receives the request from another computing device via a network connection, such as a wired, wireless, fiber optic connection, intranet, a local area network (LAN), or a wide area network (WAN).

Figure 2:
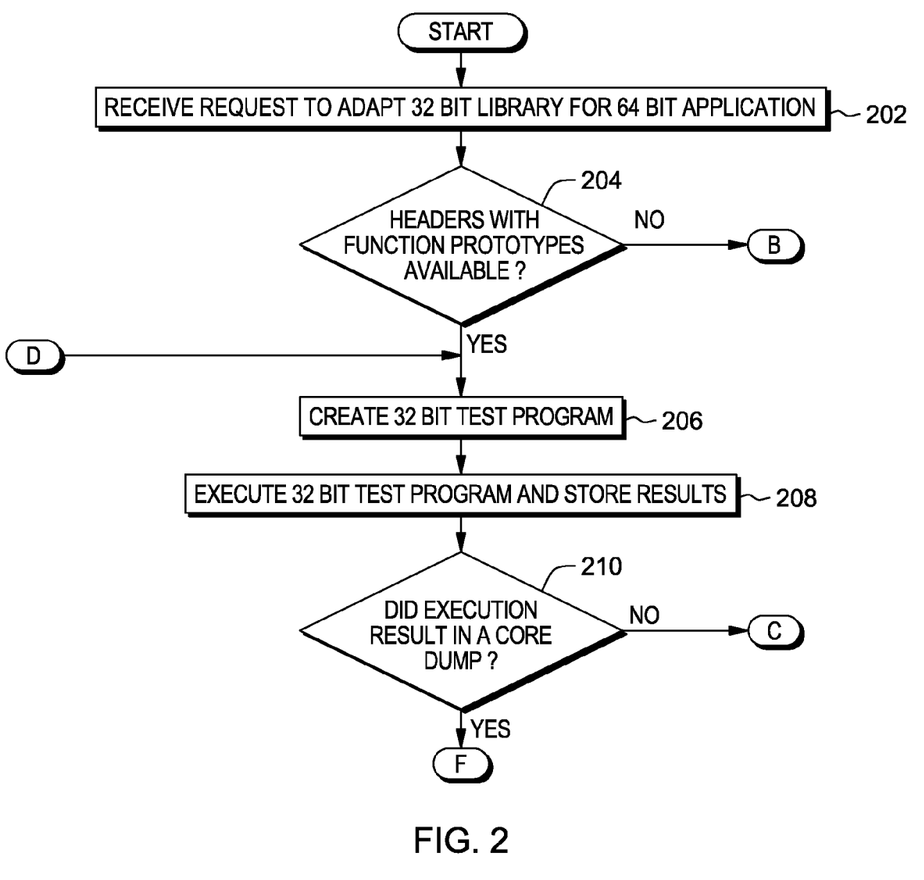
FIGS. 2 through 5 depict flowcharts illustrating the operations of adaptation program of FIG. 1, in accordance with an embodiment of the invention.
Figure 4:
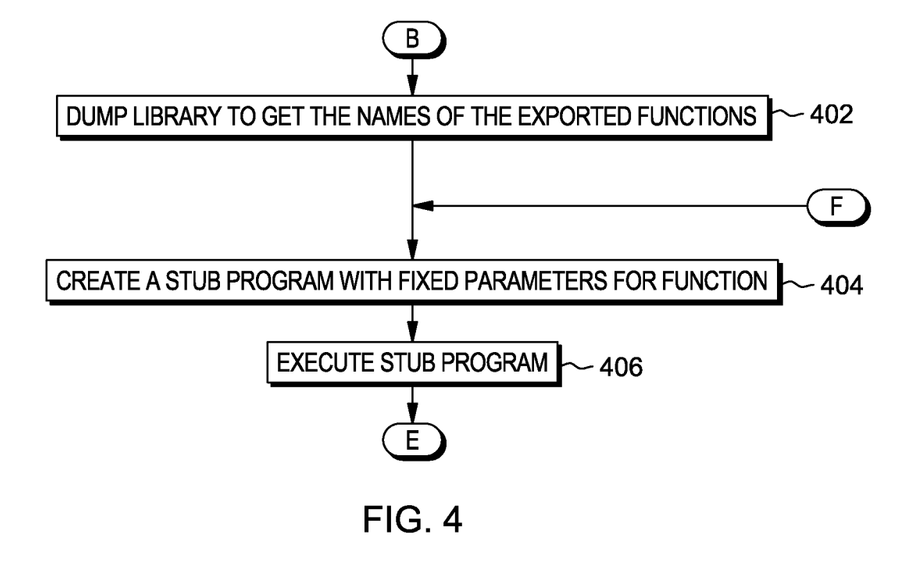

Adaptation program 112 determines whether 32 bit library 114 includes headers containing information stating the prototypes describing the interfaces to functions present within 32 bit library 114 (decision 204). In the exemplary embodiment, each header may contain several function prototypes, including the name of the functions and the parameters associated with each of the functions. A function prototype is a declaration of a function that specifies the function's return type, name, arity, and argument types. In other words, while a function definition specifies what a function does, a function prototype specifies a function's interface. For example, a function prototype "int fac(int n)" specifies a function "fac", which takes a single integer argument "n" and returns an integer. If adaptation program 112 determines that 32 bit library 114 does include headers containing information stating the prototypes describing the interfaces to functions present within 32 bit library 114 (decision 204, "yes" branch), adaptation program moves on to step 206. If adaptation program 112 determines that 32 bit library 114 does not include headers containing information stating the prototypes describing the interfaces to functions present within 32 bit library 114 (decision 204, "no" branch), adaptation program 112 performs a core dump of the contents of 32 bit library 114 in order to extract the names of the exported functions present within 32 bit library 114 (step 402). In the exemplary embodiment, performing a core dump of 32 bit library 114 allows adaptation program 112 to view the functions present within 32 bit library 114 so they may be analyzed further.

After performing the core dump (step 402), adaptation program 112 creates a stub program with fixed parameters for a function present within 32 bit library 114 (step 404). In the exemplary embodiment, a stub program is a controllable replacement for an existing dependency (or collaborator) in the system. In other words, adaptation program 112 can utilize the stub program in order to test the function (code). In the exemplary embodiment, the types of parameters associated with the stub program are determined from the information resulting from the core dump. For example, after performing the core dump, the information resulting from the core dump details the errors that have occurred in the execution of the program and points toward the type and number of parameters for each of the functions present within 32 bit library 114. Adaptation program 112 examines the contents of the core dump and determines a set of parameters for the stub program.

Figure 5:
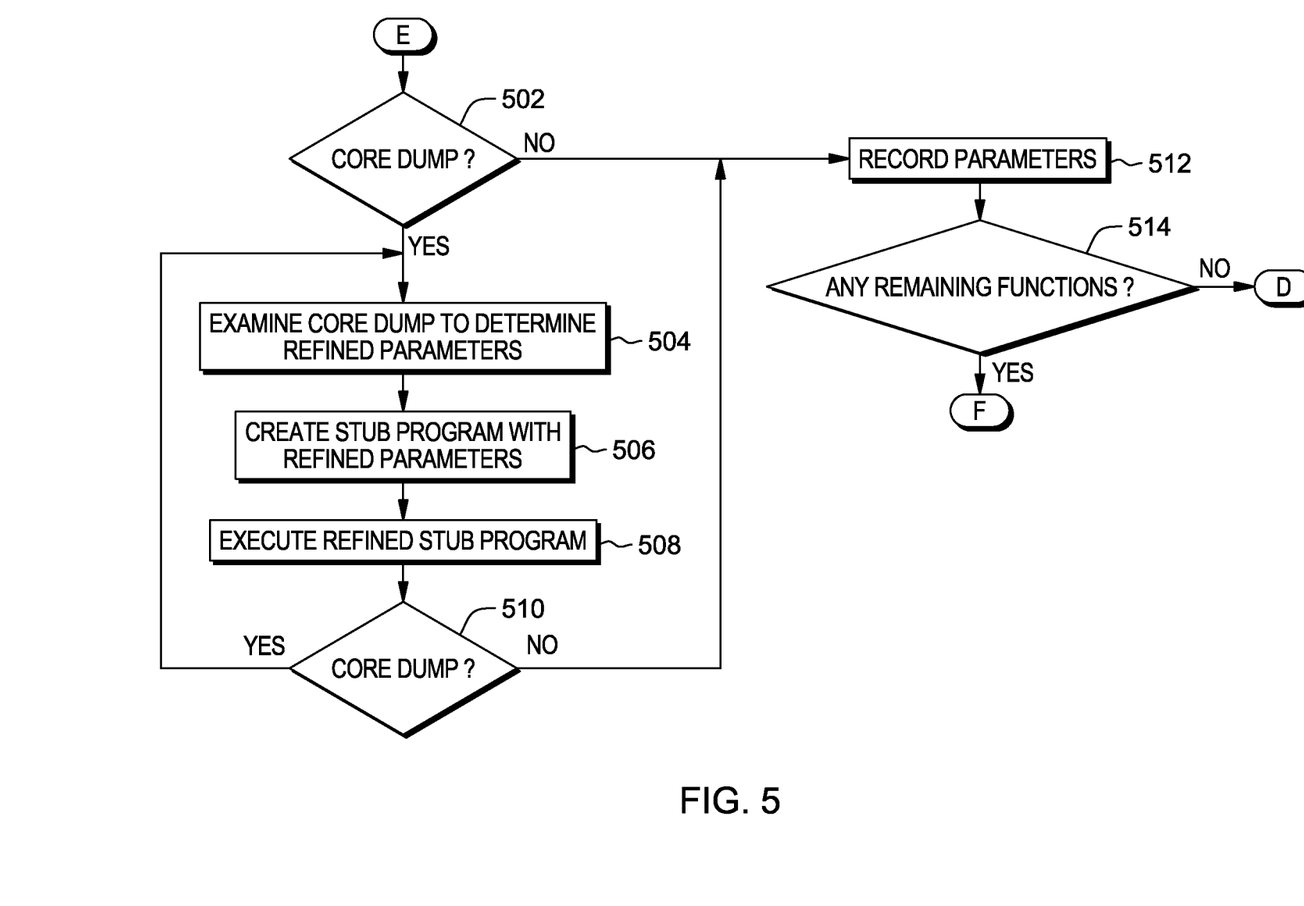

Adaptation program 112 executes the stub program (step 406). In the exemplary embodiment, the execution of the stub program allows adaptation program 112 to determine whether the parameters, such as the type and number of parameters, associated with the stub program are correct. Adaptation program 112 determines whether the execution of the stub program results in a core dump (decision 502). In the exemplary embodiment, if the parameters associated with the stub program are incorrect, then execution of the stub program results in a core dump. For example, if the type or number of parameters associated with the stub program is incorrect, then execution of the stub program will result in a core dump.

If execution of the stub program does not result in a core dump (decision 502, "no" branch), adaptation program 112 records the parameters associated with the stub program (step 512). In the exemplary embodiment, the parameters are recorded in a header format or in a valid header file, which includes the name of the function and the parameters associated with the function. Adaptation program 112 determines whether there are any remaining functions present within 32 bit library 114 (decision 514). If adaptation program 112 determines that there is a remaining function present within 32 bit library 114 (decision 514, "yes" branch), adaptation program 112 proceeds to step 404 and creates a stub program with fixed parameters for the function (step 404). If adaptation program 112 determines that there are no remaining functions present within 32 bit library 114, adaptation program 112 proceeds to step 206 and creates a 32 bit test program (step 206). This step will be explained in more detail further down in this description.

If execution of the stub program results in a core dump (decision 502, "yes" branch), adaptation program 112 examines the contents of the core dump in order to determine refined parameters (step 504). As stated above, the contents of the core dump state the errors that have occurred in the execution of the program and may point to the type and number of parameters associated with a function. Therefore, adaptation program 112 may be able to examine the contents of the core dump in order to determine a more refined set of parameters to associate with the stub function.

Adaptation program 112 creates a stub program with the refined set of parameters (step 506) and executes the refined stub program (step 508). Adaptation program 112 determines if execution of the refined stub program results in a core dump (decision 510). If adaptation program 112 determines that the execution of the refined stub program does not result in a core dump (decision 510, "no" branch), adaptation program 112 records the parameters (step 512) and determines if there are any remaining functions present within 32 bit library 114 (step 514).

If adaptation program 112 determines that the execution of the refined stub program results in a core dump (decision 510, "yes" branch), adaptation program 112 moves to step 504, examines the contents of the core dump in order to further refine the set of parameters, creates a new stub program with the new set of refined parameters, and executes the new stub program to determine if a core dump results.

As stated above, if adaptation program 112 determines that there are no remaining functions present within 32 bit library 114 (decision 514, "no" branch), adaptation program 112 creates a 32 bit test program (step 206). In the exemplary embodiment, the 32 bit test program interfaces with 32 bit library 114 and is used to test each function present within 32 bit library 114. In other words, for the embodiment where no headers with function prototypes are available, the 32 bit test program is a compilation of the final stub programs which did not result in a core dump. Consequently, the 32 bit test program contains the parameters recorded in step 512. Therefore, rather than testing specific functions present within 32 bit library 114, the 32 bit test program can be utilized to test all functions that make up 32 bit library 114.

Adaptation program 112 executes the 32 bit test program and stores the results (step 208). In the exemplary embodiment, the execution of the 32 bit test program includes the 32 bit test program calling each function with a set of arbitrary input, receiving a response (which may or may not produce a core dump), and recording the results in memory. In other embodiments, adaptation program 112 only stores the results of the execution of 32 bit test program if the execution does not produce a core dump.

Adaptation program 112 determines if execution of the 32 bit test program results in a core dump (decision 210). In other words, adaptation program 112 utilizes 32 bit test program in order to test each of the functions present within 32 bit library 114, as stated above. If execution of the 32 bit test program results in a core dump, the test is not passed (test is not successful), and adaptation program 112 re-examines the function or functions which caused the core dump.

If adaptation program 112 determines that execution of the 32 bit test program results in a core dump (decision 210, "yes" branch), adaptation program 112 returns back to step 404, and creates a stub program for each function that caused the core dump, with the stub program containing refined parameters based on information in the core dump, as described above. The stub program(s) is then executed as described above in order to determine whether the associated parameters are accurate. If the parameters are determined to be accurate, adaptation program 112 re-integrates the functions, containing refined parameters, into the 32 bit test program, and determines if execution of the 32 bit test program results in a core dump.

Figure 3:
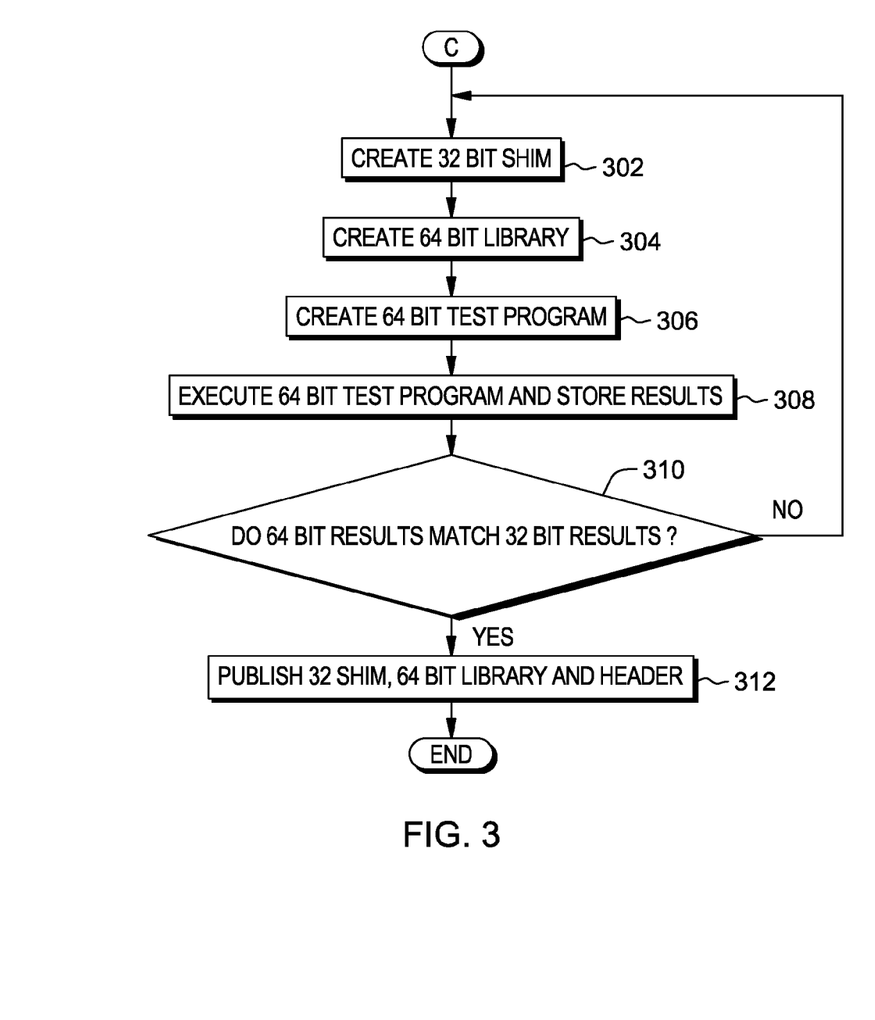

If adaptation program 112 determines that execution of the 32 bit test program does not result in a core dump (decision 210, "no" branch), the test is passed (the test is successful) and adaptation program 112 creates a 32 bit shim that incorporates all functions present within 32 bit library 114 and exposes them to the IPC interface (step 302).

Adaptation program 112 creates a 64 bit library and header file(s) (step 304). In the exemplary embodiment, the 64 bit library is capable of exposing all functions present within 32 bit library 114 to 64 bit application 116 by utilizing the IPC to interface with the 32 bit shim and 32 bit library 114.

Adaptation program 112 generates a 64 bit test program for the purpose of testing all functions present within the 64 bit library (step 306). In the exemplary embodiment, the 64 bit test program is capable of testing each function present within the 64 bit library via the 32 bit shim, in the same manner as described above. Adaptation program 112 executes the 64 bit test program and stores the results in memory (step 308).

Adaptation program 112 determines if the results from the 64 bit test match the stored results of the 32 bit test in order to verify the 32 bit shim is working properly (decision 310). If adaptation program 112 determines that the results from the 64 bit test does not match the stored results of the 32 bit test (decision 310, "no" branch), adaptation program 112 moves to step 302 and creates a new 32 bit shim. In the exemplary embodiment, based on a comparison of the 64 bit and 32 bit results, adaptation program 112 can determine which functions are incorrect and, therefore, can modify the parameters associated with the incorrect functions accordingly while creating the new 32 bit shim. If adaptation program 112 determines that the results from the 64 bit test do match the stored results of the 32 bit test (decision 310, "yes" branch), then the 32 bit shim is functioning appropriately, and therefore, adaptation program 112 publishes the 32 bit shim, the 64 bit library, and 64 bit header file (step 312). In other words, if adaptation program 112 determines the results from the 64 bit test match the stored results of the 32 bit test, the test is passed or successful, if the results from the 64 bit test do not match the stored results of the 32 bit test, the test is not successful.

Although the exemplary embodiment describes the creation of a shim program to adapt a 32 bit library to a 64 bit application, adaptation program 112 may adapt a library of any bit length to an application of any bit length in the same manner as described above. For example, adaptation program 112 may adapt a 16 bit library to a 32 bit application, or a 64 bit library to a 128 bit application, in the same manner as described above.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 6:
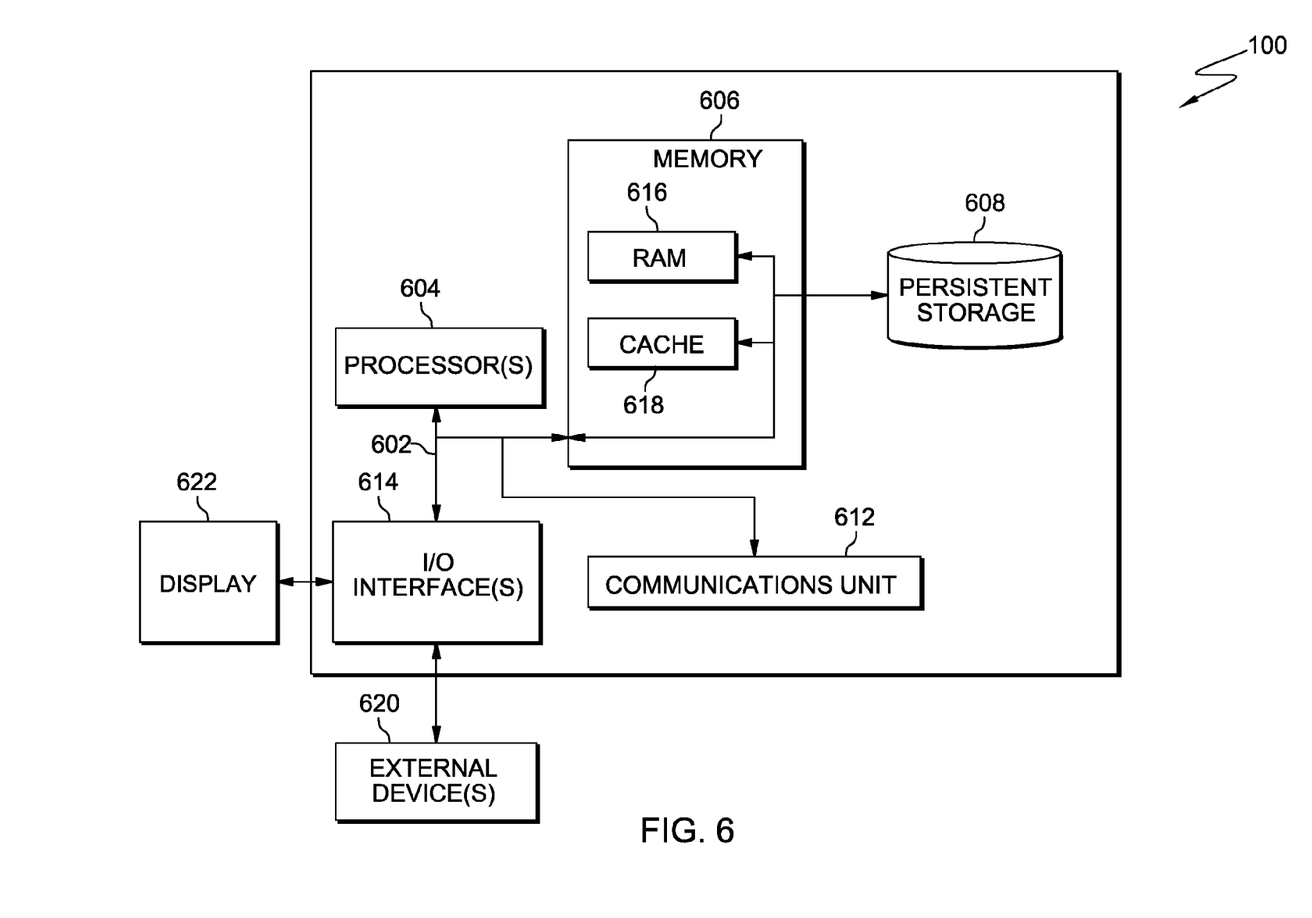
FIG. 6 is a block diagram depicting the hardware components of the adaptation system of FIG. 1, in accordance with an embodiment of the invention.

FIG. 6 depicts a block diagram of components of computing device 120 in accordance with an illustrative embodiment of the present invention. It should be appreciated that FIG. 6 provides only an illustration of one implementation and does not imply any limitations with regard to the environments in which different embodiments may be implemented. Many modifications to the environment may be made.

Computing device 120 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

The programs adaptation program 112, 32 bit library 114, and 64 bit application 116 in computing device 120 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. The programs adaptation program 112, 32 bit library 114, and 64 bit application 116 in computing device 120 may be downloaded to persistent storage 608 through communications unit 612.

I/O interface(s) 614 allows for input and output of data with other devices that may be connected to computing device 120. For example, I/O interface(s) 614 may provide a connection to external device(s) 620 such as a keyboard, keypad, a touch screen, and/or some other suitable input device. External device(s) 620 can also include portable computer-readable storage media such as, for example, thumb drives, portable optical or magnetic disks, and memory cards. Software and data used to practice embodiments of the present invention, i.e., adaptation program 112, 32 bit library 114, and 64 bit application 116, can be stored on such portable computer-readable storage media and can be loaded onto persistent storage 608 via I/O interface(s) 614. I/O interface(s) 614 can also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a program to adapt a first file of a first bit length with an application of a second bit length, comprising the steps of:
　a computing device determining a first set of functions present within a first file, wherein the first file has a first bit length;
　the computing device performing a first test, wherein performing the first test includes executing a first test program capable of testing each function of the first set of functions;
　the computing device determining whether the first test was successful;
　based on determining that the first test was successful:
　　the computing device creating a shim program based on the first set of functions;
　　the computing device creating a second file based on the first set of functions, wherein the second file has a second bit length;
　　the computing performing a second test, wherein performing the second test includes executing a second test program capable of testing each function present within the second file;
　　the computing device determining whether the second test was successful; and
　　based on determining that the second test was successful, the computing device publishing one or more of the shim program and the second file.

2. The method of claim 1, wherein the shim program has a bit length equal to the first file.

3. The method of claim 1, wherein the step of determining whether the second test was successful comprises determining whether a set of results from the second test are substantially similar to a set of results from the first test.

4. The method of claim 1, wherein determining a first set of functions present within a first file further comprises the steps of:
　the computing device identifying a header file associated with the first file; and
　the computing device identifying function prototypes describing the first set of functions within the header file.

5. The method of claim 1, wherein determining a first set of functions present within a first file further comprises the steps of:
　the computing device performing a dump of the contents of the first file;
　the computing device creating a first stub program for a first function of the first set of functions, wherein the first stub program has an associated first set of parameters;
　the computing device executing the first stub program;
　the computing device determining whether the execution of the first stub program results in a core dump; and
　based on determining that the execution of the first stub program does not result in a core dump, the computing device storing the first set of parameters in association with the first stub program.

6. The method of claim 5, further comprising the steps of:
　the computing device creating a second stub program for a second function of the first set of functions, wherein the second stub program has an associated second set of parameters;
　the computing device executing the second stub program;
　the computing device determining whether the execution of the second stub program results in a core dump; and
　based on determining that the execution of the second stub program does result in a core dump, the computing device refining the second set of parameters based on information described in the core dump.

7. The method of claim 1, further comprising, based on determining that the first test was not successful, the computing device refining parameters associated with one or more functions of the first set of functions.

8. The method of claim 1, further comprising, based on determining that the second test was not successful, the computing device refining parameters associated with one or more functions of the first set of functions.

9. A computer program product for creating a program to adapt a first file of a first bit length with an application of a second bit length, the computer program product comprising:
　one or more computer-readable storage devices and program instructions stored on at least one of the one or more tangible storage devices, the program instructions comprising:
　　program instructions to determine a first set of functions present within a first file, wherein the first file has a first bit length;
　　program instructions to perform a first test, wherein the program instructions to perform the first test includes program instructions to execute a first test program capable of testing each function of the first set of functions;
　　program instructions to determine whether the first test was successful;
　　based on determining that the first test was successful:
　　　program instructions to create a shim program based on the first set of functions;
　　　program instructions to create a second file based on the first set of functions, wherein the second file has a second bit length;
　　　program instructions to perform a second test, wherein the program instructions to perform the second test includes program instructions to execute a second test program capable of testing each function present within the second file;
　　　program instructions to determine whether the second test was successful; and
　　　based on determining that the second test was successful, program instructions to publish one or more of the shim program and the second file.

10. The computer program product of claim 9, wherein the shim program has a bit length equal to the first file.

11. The computer program product of claim 9, wherein the program instructions to determine whether the second test was successful comprise program instructions to determine whether a set of results from the second test are substantially similar to a set of results from the first test.

12. The computer program product of claim 9, wherein the program instructions to determine a first set of functions present within a first file further comprises:
　program instructions to identify a header file associated with the first file; and
　program instructions to identify function prototypes describing the first set of functions within the header file.

13. The computer program product of claim 9, wherein the program instructions to determine a first set of functions present within a first file further comprises:
- program instructions to perform a dump of the contents of the first file;
- program instructions to create a first stub program for a first function of the first set of functions, wherein the first stub program has an associated first set of parameters;
- program instructions to execute the first stub program;
- program instructions to determine whether the execution of the first stub program results in a core dump; and
- based on determining that the execution of the first stub program does not result in a core dump, program instructions to store the first set of parameters in association with the first stub program.

14. The computer program product of claim 13, further comprising:
- program instructions to create a second stub program for a second function of the first set of functions, wherein the second stub program has an associated second set of parameters;
- program instructions to execute the second stub program;
- program instructions to determine whether the execution of the second stub program results in a core dump; and
- based on determining that the execution of the second stub program does result in a core dump, program instructions to refine the second set of parameters based on information described in the core dump.

15. A computer system for creating a program to adapt a first file of a first bit length with an application of a second bit length, the computer system comprising:
- one or more processors, one or more computer-readable memories, one or more computer-readable tangible storage devices, and program instructions stored on at least one of the one or more storage devices for execution by at least one of the one or more processors via at least one of the one or more memories, the program instructions comprising:
  - program instructions to determine a first set of functions present within a first file, wherein the first file has a first bit length;
  - program instructions to perform a first test, wherein the program instructions to perform the first test includes program instructions to execute a first test program capable of testing each function of the first set of functions;
  - program instructions to determine whether the first test was successful;
  - based on determining that the first test was successful:
    - program instructions to create a shim program based on the first set of functions;
    - program instructions to create a second file based on the first set of functions, wherein the second file has a second bit length;
    - program instructions to perform a second test, wherein the program instructions to perform the second test includes program instructions to execute a second test program capable of testing each function present within the second file;
    - program instructions to determine whether the second test was successful; and
    - based on determining that the second test was successful, program instructions to publish one or more of the shim program and the second file.

16. The computer system of claim 15, wherein the shim program has a bit length equal to the first file.

17. The computer system of claim 15, wherein the program instructions to determine whether the second test was successful comprise program instructions to determine whether a set of results from the second test are substantially similar to a set of results from the first test.

18. The computer system of claim 15, wherein the program instructions to determine a first set of functions present within a first file further comprises:
- program instructions to identify a header file associated with the first file; and
- program instructions to identify function prototypes describing the first set of functions within the header file.

19. The computer system of claim 15, wherein the program instructions to determine a first set of functions present within a first file further comprises:
- program instructions to perform a dump of the contents of the first file;
- program instructions to create a first stub program for a first function of the first set of functions, wherein the first stub program has an associated first set of parameters;
- program instructions to execute the first stub program;
- program instructions to determine whether the execution of the first stub program results in a core dump; and
- based on determining that the execution of the first stub program does not result in a core dump, program instructions to store the first set of parameters in association with the first stub program.

20. The computer system of claim 19, further comprising:
- program instructions to create a second stub program for a second function of the first set of functions, wherein the second stub program has an associated second set of parameters;
- program instructions to execute the second stub program;
- program instructions to determine whether the execution of the second stub program results in a core dump; and
- based on determining that the execution of the second stub program does result in a core dump, program instructions to refine the second set of parameters based on information described in the core dump.

* * * * *